(12) United States Patent
Jeong et al.

(10) Patent No.: US 11,366,930 B1
(45) Date of Patent: Jun. 21, 2022

(54) METHOD FOR TRAINING AND TESTING OBFUSCATION NETWORK CAPABLE OF OBFUSCATING DATA TO PROTECT PERSONAL INFORMATION, AND LEARNING DEVICE AND TESTING DEVICE USING THE SAME

(71) Applicant: DEEPING SOURCE INC., Seoul (KR)

(72) Inventors: Jong Hu Jeong, Seoul (KR); Tae Hoon Kim, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

(21) Appl. No.: 17/408,690

(22) Filed: Aug. 23, 2021

(51) Int. Cl.
*G06F 21/62* (2013.01)
*G06N 20/00* (2019.01)

(52) U.S. Cl.
CPC ......... *G06F 21/6254* (2013.01); *G06N 20/00* (2019.01)

(58) Field of Classification Search
CPC ............. G06F 21/6277; G06F 21/6254; G06F 21/6245; G06N 20/00
See application file for complete search history.

(56) References Cited

U.S. PATENT DOCUMENTS

| | | | |
|---|---|---|---|
| 9,058,813 B1 * | 6/2015 | Blanksteen | G06F 40/279 |
| 2017/0372226 A1 * | 12/2017 | Costa | G06F 21/60 |
| 2018/0005626 A1 * | 1/2018 | Betley | G10L 15/02 |
| 2020/0034520 A1 * | 1/2020 | Kim | G06N 3/0454 |
| 2020/0050962 A1 * | 2/2020 | Kim | G06N 20/00 |
| 2021/0174153 A1 * | 6/2021 | Rane | G06K 9/6259 |
| 2021/0295581 A1 * | 9/2021 | Roland | G06K 9/00362 |

OTHER PUBLICATIONS

Balakrishnan R, Sloan S, Aswani A. Protecting Anonymous Speech: A Generative Adversarial Network Methodology for Removing Stylistic Indicators in Text. arXiv preprint arXiv:2110.09495. Oct. 18, 2021. (Year: 2021).*

(Continued)

*Primary Examiner* — Robert B Leung
(74) *Attorney, Agent, or Firm* — Amster, Rothstein & Ebenstein LLP

(57) ABSTRACT

A method for training an obfuscation network is provided. The method includes steps of: a learning device (a) inputting training data into an obfuscation network to generate obfuscated data for training; (b) (i) inputting the obfuscated data for training into a discriminator to output a current obfuscation score for training and (ii) (ii-1) inputting first sub-data for training into a learning network to output first sub characteristic information for training and updating current updated learning parameters of the learning network to first sub updated learning parameters and (ii-2) while increasing an integer k from 2 to n, inputting k-th sub-data for training into the learning network to output k-th sub characteristic information for training and updating (k−1)-th sub updated learning parameters of the learning network to k-th sub updated learning parameters; and (c) updating previous updated obfuscation parameters of the obfuscation network to current updated obfuscation parameters.

20 Claims, 5 Drawing Sheets

(56) References Cited

OTHER PUBLICATIONS

Zhang T, He Z, Lee RB. Privacy-preserving machine learning through data obfuscation. arXiv preprint arXiv:1807.01860. Jul. 5, 2018. (Year: 2018).*

Triastcyn A, Faltings B. Generating artificial data for private deep learning. arXiv preprint arXiv:1803.03148. Mar. 8, 2018. (Year: 2018).*

K. Vatanparvar, V. Nathan, E. Nemati, M. M. Rahman and J. Kuang, "A Generative Model for Speech Segmentation and Obfuscation for Remote Health Monitoring," 2019 IEEE 16th International Conference on Wearable and Implantable Body Sensor Networks (BSN), 2019, pp. 1-4, doi: 10.1109/BSN.2019.8771098. (Year: 2019).*

* cited by examiner

METHOD FOR TRAINING AND TESTING OBFUSCATION NETWORK CAPABLE OF OBFUSCATING DATA TO PROTECT PERSONAL INFORMATION, AND LEARNING DEVICE AND TESTING DEVICE USING THE SAME

FIELD OF THE DISCLOSURE

The present disclosure relates to a training method of an obfuscation network capable of obfuscating, e.g., concealing or anonymizing, original data to protect personal information and a learning device using the same, and to a testing method of the trained obfuscation network capable of obfuscating the original data to protect the personal information and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as the big data in the sense that common software tools and computer systems cannot easily handle such a huge volume of data.

And, although such a big data may have no meaning by itself, it can be useful for generation of new data, judgment or prediction in various fields through machine learning on patterns and the like.

Recently, due to the strengthening of a personal information protection act, it is required to delete information, that can be used for identifying individuals, from the data or to acquire consent of the individuals in order to trade or share such a big data. However, it is not easy to check if any information that can be used for identifying the individuals is present in such a large amount of the big data, and it is impossible to obtain the consent of every individual. Therefore, various techniques for such purposes have emerged.

As an example of a related prior art, a technique is disclosed in Korean Patent Registration No. 1861520. According to this technique, a face-concealing method, e.g., a face-anonymizing method, is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, where the second image is generated to have a facial shape different from that of the facial region detected in the detection step.

However, according to conventional techniques as well as the technique described above, it is determined whether identification information such as faces, text, etc. is included in the data, and then a portion corresponding to the identification information is masked or blurred. As a result, a machine learning algorithm cannot utilize such data due to distortion of original data. Also, in some cases, the data may contain unexpected identification information which cannot be obfuscated, e.g., concealed or anonymized. In particular, a conventional security camera performs an anonymizing process by blurring every pixel changed between frames due to a target to be anonymized moving between the frames in a video, and if the anonymizing process is performed in this manner, critical information such as facial expression of an anonymized face becomes different from information contained in an original video, and also, personal identification information overlooked during face detection may remain on the original video.

Accordingly, the applicant(s) of the present disclosure proposes a method for generating obfuscated data by obfuscating, i.e., concealing or anonymizing, the original data such that the obfuscated data is different from the original data, while a result of inputting the original data into a learning model and a result of inputting the obfuscated data into the learning model are same as or similar to each other.

SUMMARY OF THE DISCLOSURE

It is an object of the present disclosure to solve all the aforementioned problems.

It is another object of the present disclosure to perform obfuscation, i.e., concealment or anonymization, in a simple and accurate way, by eliminating a process of searching general data for personal identification information and a process of concealing the personal identification information.

It is still another object of the present disclosure to protect privacy and security of original data by generating obfuscated data, i.e., concealed or anonymized data, through irreversibly obfuscating the original data.

It is still yet another object of the present disclosure to generate obfuscated data recognized as similar or same by computers, but recognized as different by humans.

It is still yet another object of the present disclosure to stimulate a big data trade market.

In order to accomplish the objects above, distinctive structures of the present disclosure are described as follows.

In accordance with one aspect of the present disclosure, there is provided a method for training an obfuscation network capable of obfuscating original data to protect personal information, including steps of: (a) a learning device performing or supporting another device to perform a process of inputting training data into an obfuscation network having one or more previous updated obfuscation parameters, to thereby allow the obfuscation network to obfuscate the training data by using the previous updated obfuscation parameters and thus to generate obfuscated data for training; (b) the learning device performing or supporting another device to perform (i) a process of inputting the obfuscated data for training into a discriminator, capable of determining whether its inputted data is real or fake, to thereby allow the discriminator to output a current obfuscation score for training, representing whether the obfuscated data for training is real or fake, by using one or more current updated determination parameters and (ii) (ii-1) a process of inputting first sub-data for training into a learning network having one or more current updated learning parameters, to thereby allow the learning network to apply a learning operation to the first sub-data for training by using the current updated learning parameters and thus to output first sub characteristic information for training and a process of updating the current updated learning parameters of the learning network to first sub updated learning parameters such that at least one first sub-error, calculated by referring to (1) the first sub characteristic information for training or a first sub task specific output for training created by using the first sub characteristic information for training and (2) a ground truth of the training data, is minimized and (ii-2) while increasing an integer k from 2 to n, a process of inputting k-th sub-data for training into the learning network having one or more (k−1)-th sub updated learning parameters, to thereby allow the learning network to apply the learning operation to the k-th sub-data for training by using the (k−1)-th sub updated learning parameters and thus to output k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training; and (c) the learning device performing or supporting another device to perform a process of updating the previous updated obfuscation parameters of the obfuscation network to current updated obfuscation parameters such that at least one representative sub-error, calculated by referring to at least part of the first sub-error to the n-th sub-error created in the process of allowing the learning network to be sub-trained n times, is minimized and such that the current obfuscation score for training is maximized.

As one example, before the step of (b), the method further includes a step of: (b-1) the learning device performing or supporting another device to perform (i) (i-1) a process of inputting the training data or the modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters of the discriminator to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters of the learning network to the current updated learning parameters such that at least one main error, calculated by referring to (1) the main characteristic information for training or a main task specific output for training created by using the main characteristic information for training and (2) the ground truth of the training data, is minimized.

As one example, at least one of the first sub-data for training to the n-th sub-data for training is the training data.

As one example, the first sub-data for training to the (n−1)-th sub-data for training are the obfuscated data for training and wherein the n-th sub-data for training is the training data.

As one example, the learning device generates the representative sub-error by summation or averaging of the first sub-error to the n-th sub-error.

As one example, the learning device generates the representative sub-error by weighted summation of the first sub-error to the n-th sub-error.

As one example, the learning device allows a weight of one part of sub-errors corresponding to the training data and a weight of a remaining part of sub-errors corresponding to the obfuscated data for training to be different.

As one example, a maximum of the previous modification score for training is 1 as a value for determining the training data or the modified data for training as real by the discriminator and wherein a minimum of the previous obfuscation score for training is 0 as a value for determining the obfuscated data for training as fake by the discriminator.

In accordance with another aspect of the present disclosure, there is provided a method for testing an obfuscation network capable of obfuscating original data to protect personal information, including steps of: (a) on condition that the learning device has performed or supported another device to perform (a1) a process of inputting training data into the obfuscation network having the previous updated obfuscation parameters, to thereby allow the obfuscation network to obfuscate the training data by using the previous updated obfuscation parameters and thus to generate obfuscated data for training; (a2) (i) a process of inputting the obfuscated data for training into the discriminator, capable of determining whether its inputted data is real or fake, to thereby allow the discriminator to output a current obfuscation score for training, representing whether the obfuscated data for training is real or fake, by using the current updated determination parameters and (ii) (ii-1) a process of inputting first sub-data for training into the learning network having the current updated learning parameters, to thereby allow the learning network to apply the learning operation to the first sub-data for training by using the current updated learning parameters and thus to output first sub characteristic information for training and a process of updating the current updated learning parameters of the learning network to first sub updated learning parameters such that the first sub-error, calculated by referring to (1) the first sub characteristic information for training or the first sub task specific output for training created by using the first sub characteristic information for training and (2) the ground truth of the training data, is minimized and (ii-2) while increasing the integer k from 2 to n, a process of inputting k-th sub-data for training into the learning network having the (k−1)-th sub updated learning parameters, to thereby allow the learning network to apply the learning operation to the k-th sub-data for training by using the (k−1)-th sub updated learning parameters and thus to output the k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training; and (a3) a process of updating the previous updated obfuscation parameters of the obfuscation network to current updated obfuscation parameters such that the representative sub-error, calculated by referring to at least part of the first sub-error to the n-th sub-error created in the process of allowing the learning network to be sub-trained n times, is minimized and such that the current obfuscation score for training is maximized, a testing device performing or supporting another device to perform a process of acquiring test data; and (b) the testing device performing or supporting another device to perform a process of inputting the test data into the obfuscation network, to thereby allow the obfuscation network to obfuscate the test data by using the learned obfuscation parameters of the obfuscation network and thus to output obfuscated data for testing.

As one example, before the step of (a2), the discriminator and the learning network have been trained by the learning device through (i) (i-1) a process of inputting the training data or the modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters to the current updated learning parameters such that at least one main error, calculated by referring to (1) the main characteristic information for training or a main task specific output for training created by using the main characteristic information for training and (2) the ground truth of the training data, is minimized.

In accordance with still another aspect of the present disclosure, there is provided a learning device for training an obfuscation network capable of obfuscating original data to protect personal information, including: at least one memory that stores instructions; and at least one processor configured to execute the instructions to perform or support another device to perform: (I) a process of inputting training data into an obfuscation network having one or more previous updated obfuscation parameters, to thereby allow the obfuscation network to obfuscate the training data by using the previous updated obfuscation parameters and thus to generate obfuscated data for training, (II) (i) a process of inputting the obfuscated data for training into a discriminator, capable of determining whether its inputted data is real or fake, to thereby allow the discriminator to output a current obfuscation score for training, representing whether the obfuscated data for training is real or fake, by using one or more current updated determination parameters and (ii) (ii-1) a process of inputting first sub-data for training into a learning network having one or more current updated learning parameters, to thereby allow the learning network to apply a learning operation to the first sub-data for training by using the current updated learning parameters and thus to output first sub characteristic information for training and a process of updating the current updated learning parameters of the learning network to first sub updated learning parameters such that at least one first sub-error, calculated by referring to (1) the first sub characteristic information for training or a first sub task specific output for training created by using the first sub characteristic information for training and (2) a ground truth of the training data, is minimized and (ii-2) while increasing an integer k from 2 to n, a process of inputting k-th sub-data for training into the learning network having one or more (k−1)-th sub updated learning parameters, to thereby allow the learning network to apply the learning operation to the k-th sub-data for training by using the (k−1)-th sub updated learning parameters and thus to output k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training, and (III) a process of updating the previous updated obfuscation parameters of the obfuscation network to current updated obfuscation parameters such that at least one representative sub-error, calculated by referring to at least part of the first sub-error to the n-th sub-error created in the process of allowing the learning network to be sub-trained n times, is minimized and such that the current obfuscation score for training is maximized.

As one example, before the process of (II), the processor further performs or supports another device to perform: (II-1) (i) (i-1) a process of inputting the training data or the modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters of the discriminator to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters of the learning network to the current updated learning parameters such that at least one main error, calculated by referring to (1) the main characteristic information for training or a main task specific output for training created by using the main characteristic information for training and (2) the ground truth of the training data, is minimized.

As one example, at least one of the first sub-data for training to the n-th sub-data for training is the training data.

As one example, the first sub-data for training to the (n−1)-th sub-data for training are the obfuscated data for training and wherein the n-th sub-data for training is the training data.

As one example, the processor generates the representative sub-error by summation or averaging of the first sub-error to the n-th sub-error.

As one example, the processor generates the representative sub-error by weighted summation of the first sub-error to the n-th sub-error.

As one example, the processor allows a weight of one part of sub-errors corresponding to the training data and a weight of a remaining part of sub-errors corresponding to the obfuscated data for training to be different.

As one example, a maximum of the previous modification score for training is 1 as a value for determining the training data or the modified data for training as real by the discriminator and wherein a minimum of the previous obfuscation score for training is 0 as a value for determining the obfuscated data for training as fake by the discriminator.

In accordance with still yet another aspect of the present disclosure, there is provided a testing device for testing an obfuscation network capable of obfuscating original data to protect personal information, including: at least one memory that stores instructions; and at least one processor configured to execute the instructions to perform or support another device to perform: (I) on condition that a learning device has performed (I1) a process of inputting training data into the obfuscation network having the previous updated obfuscation parameters, to thereby allow the obfuscation network to obfuscate the training data by using the previous updated obfuscation parameters and thus to generate obfuscated data for training, (I2) (i) a process of inputting the obfuscated data for training into the discriminator, capable of determining whether its inputted data is real or fake, to thereby allow the discriminator to output a current obfuscation score for training, representing whether the obfuscated data for training is real or fake, by using the current updated determination parameters and (ii) (ii-1) a process of inputting first sub-data for training into the learning network having the current updated learning parameters, to thereby allow the learning network to apply the learning operation to the first sub-data for training by using the current updated learning parameters and thus to output first sub characteristic information for training and a process of updating the current updated learning parameters of the learning network to first sub updated learning parameters such that the first sub-error, calculated by referring to (1) the first sub characteristic information for training or the first sub task specific output for training created by using the first sub characteristic information for training and (2) the ground truth of the training data, is minimized and (ii-2) while increasing the integer k from 2 to n, a process of inputting k-th sub-data for training into the learning network having the (k−1)-th sub updated learning parameters, to thereby allow the learning network to apply the learning operation to the k-th sub-data for training by using the (k−1)-th sub updated learning parameters and thus to output the k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training, and (I3) a process of updating the previous updated obfuscation parameters of the obfuscation network to current updated obfuscation parameters such that the representative sub-error, calculated by referring to at least part of the first sub-error to the n-th sub-error created in the process of allowing the learning network to be sub-trained n times, is minimized and such that the current obfuscation score for training is maximized, a process of acquiring test data and (II) a process of inputting the test data into the obfuscation network, to thereby allow the obfuscation network to obfuscate the test data by using the learned obfuscation parameters of the obfuscation network and thus to output obfuscated data for testing.

As one example, before the process of (I2), the discriminator and the learning network have been trained by the learning device through (i) (i-1) a process of inputting the training data or the modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters to the current updated learning parameters such that at least one main error, calculated by referring to (1) the main characteristic information for training or a main task specific output for training created by using the main characteristic information for training and (2) the ground truth of the training data, is minimized.

In addition, recordable media that are readable by a computer for storing a computer program to execute the method of the present disclosure are further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
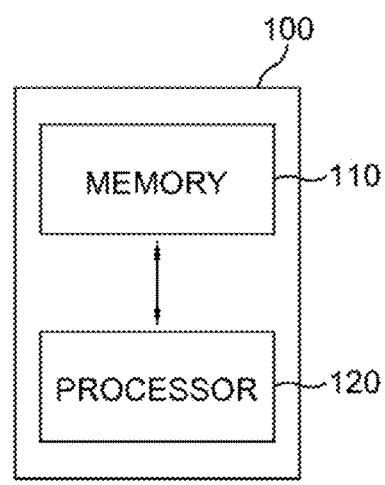
FIG. 1 is a drawing schematically illustrating a learning device for learning an obfuscation network capable of obfuscating, i.e., concealing or anonymizing, original data in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

For reference, throughout the present disclosure, the phrase "for training", "training", or "learning" is added for terms related to training processes, and the phrase "for testing", "testing", or "test" is added for terms related to testing processes, to avoid possible confusion.

To allow those skilled in the art to carry out the present disclosure easily, the example embodiments of the present disclosure will be explained in detail as shown below by referring to attached drawings.

FIG. 1 is a drawing schematically illustrating a learning device for learning an obfuscation network capable of obfuscating, i.e., concealing or anonymizing, original data in accordance with one example embodiment of the present disclosure.

By referring to FIG. 1, the learning device 100 in accordance with one example embodiment of the present disclosure may include a memory 110 for storing instructions to train the obfuscation network capable of obfuscating training data such that a learning network 100 outputs a result, calculated by using the obfuscated data for training as an input, same or similar to a result calculated by using the training data as an input, and a processor 120 for performing processes to train the obfuscation network according to the instructions in the memory 110.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Meanwhile, in response to acquiring the training data, according to the instructions stored in the memory 120, the processor 100 of the learning device 110 may input the training data into the obfuscation network having one or more previous updated obfuscation parameters, to thereby allow the obfuscation network to obfuscate, i.e., conceal or anonymize, the training data by using the previous updated obfuscation parameters and thus to generate the obfuscated data for training. Herein, if the training of the obfuscation network is a first iteration for training, the previous updated obfuscation parameters may be first obfuscation parameters of an obfuscation network designed initially. And the processor 120 of the learning device 100 may perform or support another device to perform a process of inputting the obfuscated data for training into a discriminator, capable of determining whether its inputted data is real or fake, to thereby allow the discriminator to output a current obfuscation score for training, representing whether the obfuscated data for training is real or fake, by using one or more current updated determination parameters. Further, the processor 120 of the learning device 100 may perform or support another device to perform (i) a process of inputting first sub-data for training into a learning network having one or more current updated learning parameters, to thereby allow the learning network to apply a learning operation to the first sub-data for training by using the current updated learning parameters and thus to output first sub characteristic information for training and a process of updating the current updated learning parameters of the learning network to first sub updated learning parameters such that at least one first sub-error, calculated by referring to (1) the first sub characteristic information for training or a first sub task specific output for training created by using the first sub characteristic information for training and (2) a ground truth of the training data, is minimized and (ii) while increasing an integer k from 2 to n, a process of inputting k-th sub-data for training into the learning network having one or more (k−1)-th sub updated learning parameters, to thereby allow the learning network to apply the learning operation to the k-th sub-data for training by using the (k−1)-th sub updated learning parameters and thus to output k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times. Herein, the first sub-data for training to the n-th sub-data for training may be selected among the training data and the obfuscated data for training. Thereafter, the processor 120 of the learning device 100 may perform or support another device to perform a process of updating the previous updated obfuscation parameters of the obfuscation network to current updated obfuscation parameters such that at least one representative sub-error, calculated by referring to at least part of the first sub-error to the n-th sub-error created in the process of allowing the learning network to be sub-trained n times, is minimized and such that the current obfuscation score for training is maximized.

Then, the processor 120 of the learning device 100 may perform or support another device to perform (i) a process of inputting the training data or the modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (ii) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (iii) a process of updating the previous updated determination parameters of the discriminator to the current updated determination parameters such that the previous modification score for training is maximized and such that the previous obfuscation score for training is minimized. Further, the processor 120 of the learning device 100 may perform or support another device to perform (i) a process of inputting the obfuscated data for training into the learning network having one or more previous updated learning parameters, to thereby allow the learning network to apply the learning operation to the obfuscated data for training by using the previous updated learning parameters and thus to output main characteristic information for training and (ii) a process of updating the previous updated learning parameters of the learning network to the current updated learning parameters such that at least one main error, calculated by referring to (1) the main characteristic information for training or a main task specific output for training created by using the main characteristic information for training and (2) the ground truth of the training data, is minimized.

A method for training the obfuscation network capable of obfuscating, e.g., concealing or anonymizing, the original data to protect personal information by using the learning device 100 in accordance with one example embodiment of the present disclosure is described by referring to FIGS. 2 to 3 as follows.

Figure 2:
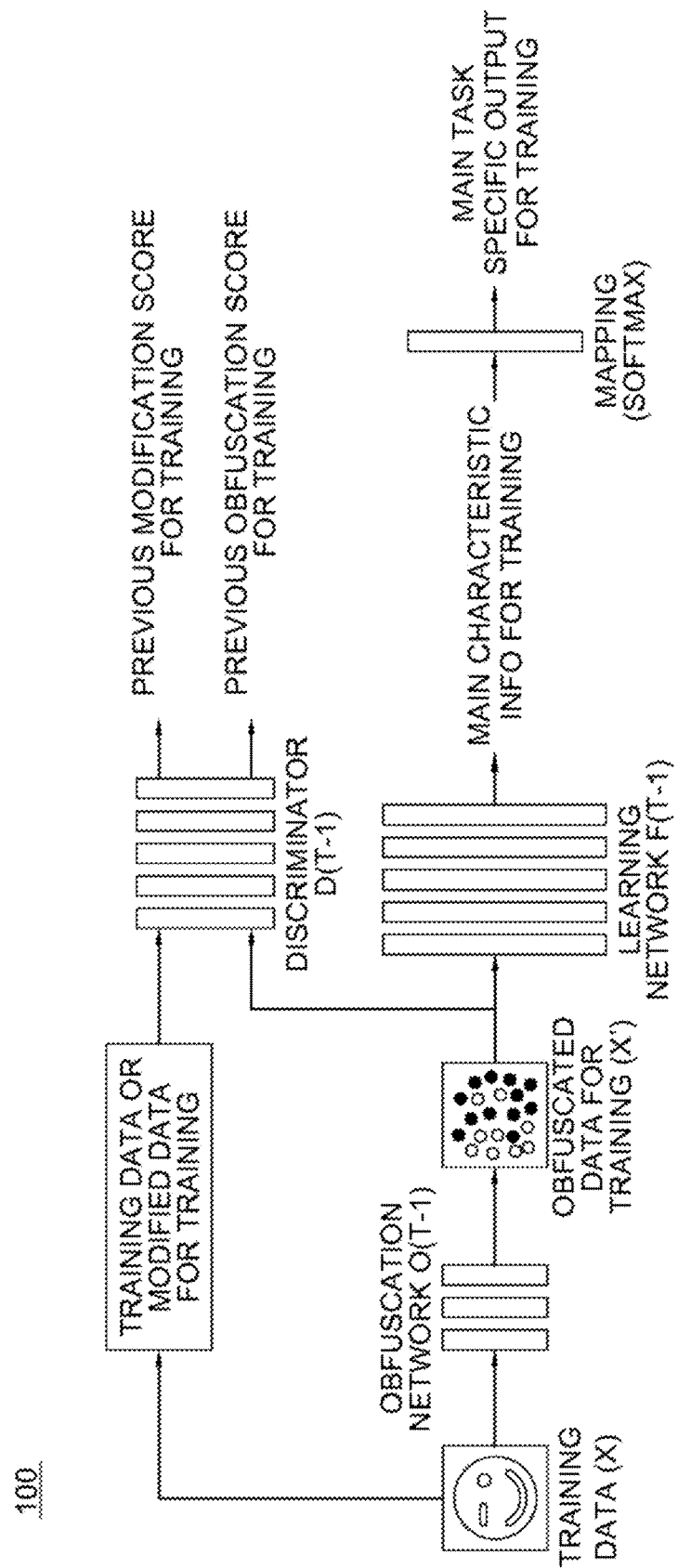
FIG. 2 is a drawing schematically illustrating a method for training a discriminator and a learning network in accordance with one example embodiment of the present disclosure.

FIG. 2 is a drawing schematically illustrating a method for training the discriminator and the learning network in accordance with one example embodiment of the present disclosure.

First, if the training data x is acquired, the learning device 100 may input the training data x into the obfuscation network O(t−1) having the previous updated obfuscation parameters, to thereby allow the obfuscation network O(t−1) to obfuscate the training data x by using the previous updated obfuscation parameters and thus to generate the obfuscated data for training x'.

Herein, the training data x may be original training data which is the original data to be used for training, or may be the modified data for training generated by modifying the original training data, and the modified data for training may be generated by adding at least one random noise created through a random noise generating network (not illustrated) to the original training data. As one example, the random noise generating network may be instructed to generate the random noise having a normal distribution $N(0, \sigma)$, and the generated noise may be added to the original training data, to thereby generate the modified data for training. Also, the modified data for training may be generated by blurring the original training data, or changing a resolution of the original training data, as well as using the random noise, but the scope of the present disclosure is not limited thereto, and various ways of modifying the original training data may be used.

Also, the obfuscated data for training x' may be recognized as data different from the training data x by a human, but may be recognized as data similar or same as the training data x by the learning network.

Meanwhile, as one example, the obfuscation network may include an encoder having one or more convolutional layers for applying one or more convolution operations to images which are the training data x, and a decoder having one or more deconvolutional layers for applying one or more deconvolution operations to at least one feature map outputted from the encoder and for generating the obfuscated data for training x', but the scope of the present disclosure is not limited thereto, and may include any learning networks having various structures capable of obfuscating the inputted training data. Also, a subject to be obfuscated, e.g., a subject to be anonymized or concealed, may be personal information included in the original data. Herein, the personal information may include any information related to a person, such as personal identification information, personal medical information, personal biometric information, personal behavioral information, etc.

Also, if the training of the obfuscation network is a first iteration for training, the previous updated obfuscation parameters may be first obfuscation parameters of an obfuscation network designed initially.

Next, the learning device 100 may input the training data x or the modified data for training into the discriminator D(t−1) having previous updated determination parameters, to thereby allow the discriminator D(t−1) to output a previous modification score for training, representing whether the training data or the modified data for training is real or fake, by using the previous updated determination parameters.

Herein, the modified data for training may be generated by modifying the training data x or the obfuscated data for training x', that is, the modified data for training may be generated by adding at least one random noise created through the random noise generating network (not illustrated) to the training data x or the obfuscated data for training x'. Also, if the training of the discriminator is a first iteration for training, the previous updated determination parameters may be first determination parameters of a discriminator designed initially.

Further, the learning device 100 may input the obfuscated data for training x' into the discriminator D(t–1) having the previous updated determination parameters, to thereby allow the discriminator D(t–1) to output a previous obfuscation score for training, representing whether the obfuscated data for training x' is real or fake, by using the previous updated determination parameters.

Next, the learning device 100 may perform or support another device to perform a process of updating the previous updated determination parameters of the discriminator D(t–1) to the current updated determination parameters such that the previous modification score for training is maximized and such that the previous obfuscation score for training is minimized, to thereby train the discriminator D(t–1) having the previous updated determination parameters to allow the discriminator D(t–1) to be the discriminator D(t) having the current updated determination parameters.

Herein, a maximum of the modification score for training corresponding to the training data x or the modified data for training inputted into the discriminator may be 1 as a value for determining the training data or the modified data for training as real, and a minimum of the obfuscation score for training corresponding to the obfuscated data for training inputted into the discriminator may be 0 as a value for determining the obfuscated data for training x' as fake. That is, the discriminator may be trained to determine the training data or the modified data for training as real and to determine the obfuscated data for training as fake.

Next, the learning device 100 may perform or support another device to perform a process of inputting the obfuscated data for training x' into the learning network F(t–1) having the previous updated learning parameters, to thereby allow the learning network F(t–1) to apply the learning operation to the obfuscated data for training x' by using the previous updated learning parameters and thus to output main characteristic information for training.

And the learning device 100 may perform or support another device to perform a process of updating the previous updated learning parameters of the learning network F(t–1) to the current updated learning parameters such that at least one main error, calculated by referring to (1) the main characteristic information for training or a main task specific output for training created by using the main characteristic information for training and (2) the ground truth of the training data x, is minimized, to thereby train the learning network F(t–1) having the previous updated learning parameters to allow the learning network F(t–1) to be the learning network F(t) having the current updated learning parameters.

Herein, if the training of the learning network is a first iteration for training, the previous updated learning parameters may be first learning parameters of a learning network designed initially.

And, the learning network may include a machine learning network, but the scope of the present disclosure is not limited thereto, and may include any learning network capable of generating the characteristic information by applying the learning operation to the inputted obfuscated data for training x' according to the learning parameters. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms.

Also, the characteristic information may be feature values related to certain features in the obfuscated data for training x', or the logits including values related to at least one of vectors, matrices, and coordinates related to the certain features. For example, if the training data x are facial image data, the result above may be classes for face recognition, facial features, e.g., laughing expressions, coordinates of facial landmark points, e.g., both end points on far sides of an eye.

Further, the task specific output may be an output of a task to be performed by the learning network, and may have various results according to the designed task by the learning network, such as a probability of a class for classification, coordinates resulting from regression for location detection, etc., and an activation function of an activation unit may be applied to the characteristic information outputted from the learning network, to thereby generate the task specific output according to the task to be performed by the learning network. Herein, the activation function may include a sigmoid function, a linear function, a softmax function, an rlinear function, a square function, a sqrt function, an srlinear function, an abs function, a tanh function, a brlinear function, etc. but the scope of the present disclosure is not limited thereto.

As one example, when the learning network performs the task for the classification, the learning device 100 may map the characteristic information outputted from the learning network onto each of classes, to thereby generate one or more probabilities of the obfuscated data for training, for each of the classes. Herein, the probabilities for each of the classes may represent probabilities of the characteristic information, outputted for each of the classes from the learning network, being correct. For example, if the training data are the facial image data, a probability of the face having a laughing expression may be outputted as 0.75, and a probability of the face not having the laughing expression may be outputted as 0.25, and the like. Herein, a softmax algorithm may be used for mapping the characteristic information outputted from the learning network onto each of the classes, but the scope of the present disclosure is not limited thereto, and various algorithms may be used for mapping the characteristic information onto each of the classes.

Meanwhile, the above description explains that the discriminator D(t–1) having the previous updated determination parameters is trained to be the discriminator D(t) having the current updated determination parameters, and then the learning network F(t–1) having the previous updated learning parameters is trained to be the learning network F(t) having the current updated learning parameters. However, the order of training the discriminator and the learning network may be different, and each current training iteration of the discriminator and the learning network may be performed without regard to the order.

A method of training the obfuscation network O(t−1) having one or more previous updated obfuscation parameters, after the discriminator D(t) having the current updated determination parameters and the learning network F(t) having the current updated learning parameters have been trained, is described by referring to FIG. 3 as follows.

First, the learning device 100 may perform or support another device to perform a process of inputting the obfuscated data for training x' into the discriminator D(t), capable of determining whether its inputted data is real or fake, to thereby allow the discriminator D(t) to output a current obfuscation score for training, representing whether the obfuscated data for training is real or fake, by using the current updated determination parameters.

Next, the learning device 100 may perform or support another device to perform a process of inputting first sub-data for training, selected first, into the learning network F(t) having the current updated learning parameters, to thereby allow the learning network F(t) to apply the learning operation to the first sub-data for training by using the current updated learning parameters and thus to output first sub characteristic information for training. Herein, the first sub-data for training to the n-th sub-data for training may be selected among the training data x and the obfuscated data for training x'. Thereafter, the learning device 100 may perform or support another device to perform a process of updating the current updated learning parameters of the learning network F(t) to the first sub updated learning parameters such that a first sub-error, calculated by referring to (1) the first sub characteristic information for training or a first sub task specific output for training created by using the first sub characteristic information for training and (2) the ground truth of the training data x, is minimized, to thereby perform a first sub-training such that the learning network F(t) having the current updated learning parameters becomes the learning network F(t_1) having one or more first sub updated learning parameters.

Then, the learning device 100 may perform or support another device to perform a process of inputting the second sub-data for training, selected secondly among the training data x and the obfuscated data for training x', into the learning network F(t_1) having the first sub updated learning parameters, to thereby allow the learning network F(t_1) to apply the learning operation to the second sub-data for training by using the first sub updated learning parameters and thus to output second sub characteristic information for training. Thereafter, the learning device 100 may perform or support another device to perform a process of updating the first sub updated learning parameters of the learning network F(t_1) to the second sub updated learning parameters such that a second sub-error, calculated by referring to (1) the second sub characteristic information for training or a second sub task specific output for training created by using the second sub characteristic information for training and (2) the ground truth of the training data x, is minimized, to thereby perform a second sub-training such that the learning network F(t_1) having the first sub updated learning parameters becomes the learning network F(t_2) having one or more second sub updated learning parameters.

Then, the learning device 100 may train the learning network n times by using the sub-data for training, as described above.

That is, while increasing an integer k from 2 to n, the learning device 100 may perform or support another device to perform (i) a process of inputting k-th sub-data for training into the learning network F(t_(k−1)) having one or more (k−1)-th sub updated learning parameters, to thereby allow the learning network F(t_(k−1)) to apply the learning operation to the k-th sub-data for training by using the (k−1)-th sub updated learning parameters and thus to output k-th sub characteristic information for training and (ii) a process of updating the (k−1)-th sub updated learning parameters of the learning network F(t_(k−1)) to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data x, is minimized, such that the learning network F(t_(k−1)) having the (k−1)-th sub updated learning parameters becomes the learning network F(t_k) having the k-th sub updated learning parameters, to thereby perform a process of allowing the learning network having the current updated learning parameters to be sub-trained n times.

Herein, at least one of the first sub-data for training to the n-th sub-data for training may be the training data x.

Herein, the first sub-data for training to the (n−1)-th sub-data for training may be the obfuscated data for training x', and also, the n-th sub-data for training may be the training data x. For reference, FIG. 3 shows that only n-th sub-data for training is selected as the training data x.

Next, the learning device 100 may perform or support another device to perform a process of updating the previous updated obfuscation parameters of the obfuscation network O(t−1) to current updated obfuscation parameters such that at least one representative sub-error, calculated by referring to at least part of the first sub-error to the n-th sub-error created in the process of allowing the learning network F(t) having the current updated learning parameters to be sub-trained n times, is minimized and such that the current obfuscation score for training is maximized, to thereby perform the current training iteration such that the obfuscation network O(t−1) having the previous updated obfuscation parameters becomes the obfuscation network O(t) having the current updated obfuscation parameters.

Herein, the learning device 100 may generate the representative sub-error by summation or averaging of the first sub-error to the n-th sub-error.

Further, the learning device 100 may generate the representative sub-error by weighted summation of the first sub-error to the n-th sub-error. Herein, the learning device 100 may increase or decrease weights in the order of the first sub-error to the n-th sub-error. Also, the learning device 100 may allow a weight of one part of sub-errors corresponding to the training data x and a weight of a remaining part of sub-errors corresponding to the obfuscated data for training x' to be different. However, the scope of the present disclosure is not limited thereto, and the weights to be used for the weighted summation may be set in various ways.

As such, by repeating the method as above using every piece of the training data, the obfuscation network may be trained so that the obfuscation network obfuscates, i.e., conceals or anonymizes, the original data to generate the obfuscated data from which humans cannot recognize the original data but the learning network can recognize the original data. Also, the obfuscation network is trained by using the sub-errors created as a result of training the learning network n times with the training data and the obfuscated data for training, and therefore the obfuscation network may generate the obfuscated data more recognizable by the learning network.

Figure 4:
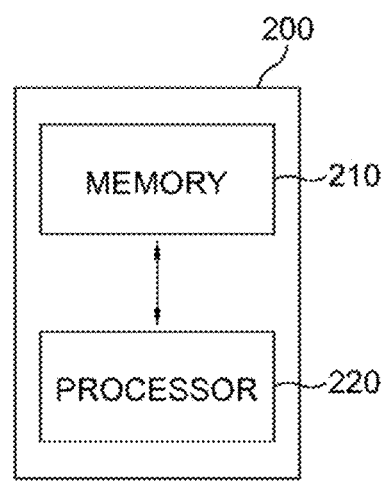
FIG. 4 is a drawing schematically illustrating a testing device for testing the trained obfuscation networks in accordance with one example embodiment of the present disclosure.

FIG. 4 is a drawing schematically illustrating a testing device for testing a trained obfuscation network O in accordance with one example embodiment of the present disclosure.

By referring to FIG. 4, the testing device 200 in accordance with one example embodiment of the present disclosure may include a memory 210 for storing instructions to test the trained obfuscation network which has been learned to obfuscate data for testing such that the learning network outputs a result, calculated by using the obfuscated data for testing, same or similar to a result calculated by using the test data, and a processor 220 for performing processes to test the trained obfuscation network according to the instructions in the memory 210.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Meanwhile, on condition that the learning device has performed (a) a process of inputting the training data into the obfuscation network having the previous updated obfuscation parameters, to thereby allow the obfuscation network to obfuscate the training data by using the previous updated obfuscation parameters and thus to generate the obfuscated data for training, (b) (i) a process of inputting the obfuscated data for training into the discriminator, capable of determining whether its inputted data is real or fake, to thereby allow the discriminator to output a current obfuscation score for training, representing whether the obfuscated data for training is real or fake, by using the current updated determination parameters and (ii) (ii-1) a process of inputting first sub-data for training into the learning network having the current updated learning parameters, to thereby allow the learning network to apply the learning operation to the first sub-data for training by using the current updated learning parameters and thus to output first sub characteristic information for training and a process of updating the current updated learning parameters of the learning network to first sub updated learning parameters such that at least one first sub-error, calculated by referring to (1) the first sub characteristic information for training or a first sub task specific output for training created by using the first sub characteristic information for training and (2) a ground truth of the training data, is minimized and (ii-2) while increasing an integer k from 2 to n, a process of inputting k-th sub-data for training into the learning network having one or more (k−1)-th sub updated learning parameters, to thereby allow the learning network to apply the learning operation to the k-th sub-data for training by using the (k−1)-th sub updated learning parameters and thus to output k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training, and (c) a process of updating the previous updated obfuscation parameters of the obfuscation network to current updated obfuscation parameters such that at least one representative sub-error, calculated by referring to at least part of the first sub-error to the n-th sub-error created in the process of allowing the learning network to be sub-trained n times, is minimized and such that the current obfuscation score for training is maximized, then in response to acquiring test data, the processor 220 of the testing device 200 may perform or support another device to perform a process of inputting the test data into the obfuscation network, to thereby allow the obfuscation network to obfuscate the test data by using one or more learned obfuscation parameters and thus to generate obfuscated data for testing, according to the instructions stored in the memory 210.

Figure 5:
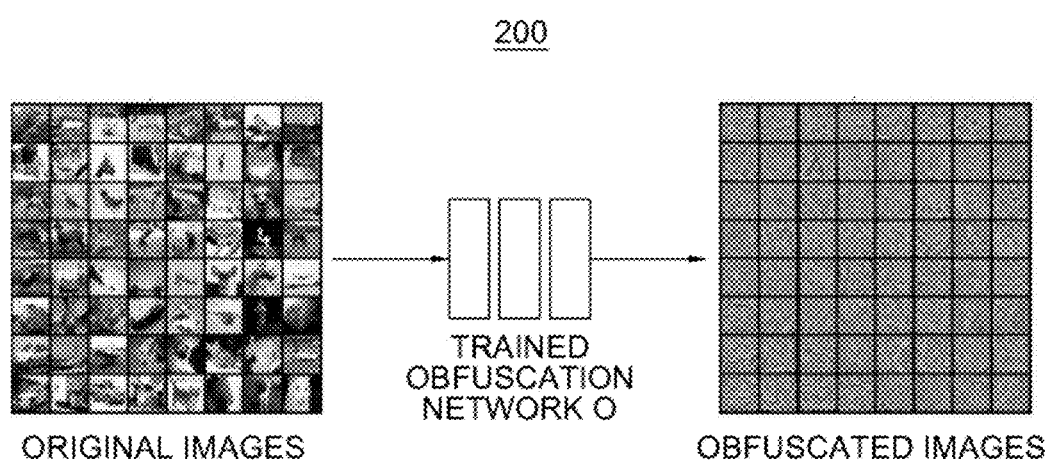
FIG. 5 is a drawing schematically illustrating a method for testing the trained obfuscation network in accordance with one example embodiment of the present disclosure.

FIG. 5 is a drawing schematically illustrating a method for testing the trained obfuscation network in accordance with one example embodiment of the present disclosure.

By referring to FIG. 5, the testing device 200 may (i) input the test data, for example, original images on a left side of FIG. 5, into the obfuscation network O which has been trained to obfuscate the original data such that the learning network outputs a result, generated by inputting the obfuscated data into the learning network, same or similar to a result generated by inputting the original data into the learning network and thus (ii) allow the obfuscation network O to obfuscate the test data according to the learned parameters, to thereby output the obfuscated data for testing, e.g., obfuscated images on a right side of FIG. 5.

For reference, the left side of FIG. 5 is a drawing exemplarily illustrating 64 image samples selected from the CIFAR-10 dataset which includes images collected and labeled by Canadian Institute for Advanced Research (CIFAR) for image classification.

The obfuscated data generated by obfuscating, i.e., anonymizing or concealing, the image samples on the left side of FIG. 5 used as the original data, in accordance with the present disclosure, are shown on the right side of FIG. 5.

By referring to FIG. 5, 64 pieces of the obfuscated data on the right side of FIG. 5 which are obfuscated, e.g., anonymized or concealed, in accordance with the present disclosure are visually different from 64 pieces of the original data on the left side of FIG. 5, but if the 64 pieces of the obfuscated data are inputted into the learning network, the learning network outputs a result same as or similar to that of the original data.

Figure 3:
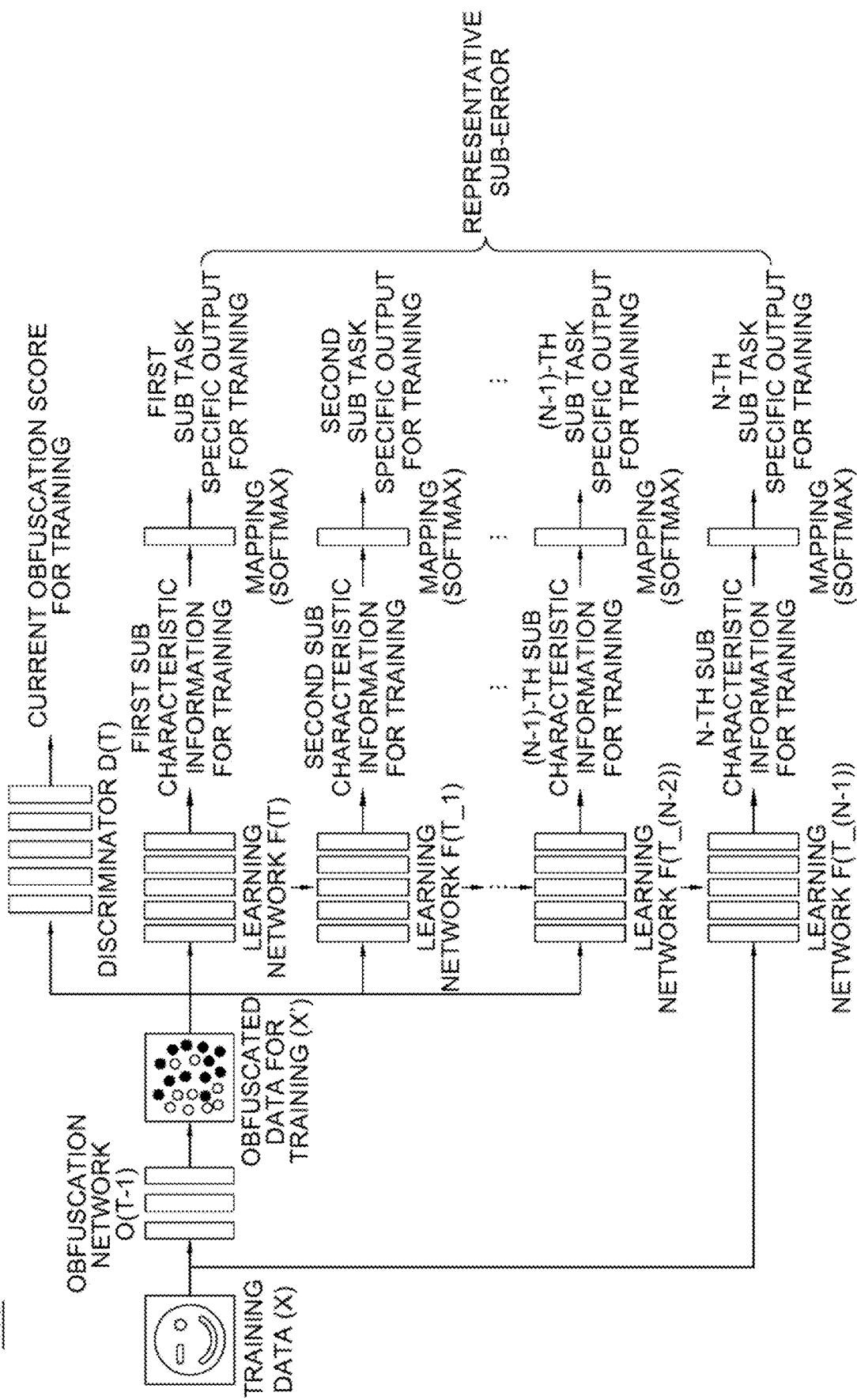
FIG. 3 is a drawing schematically illustrating a learning method for learning an obfuscation network capable of concealing the original data in accordance with one example embodiment of the present disclosure.

Meanwhile, the trained obfuscation network O may have been trained beforehand by processes similar to those in description of FIGS. 2 to 3.

That is, the trained obfuscation network O may have been trained by the learning device through (a) a process of inputting training data into the obfuscation network having the previous updated obfuscation parameters, to thereby allow the obfuscation network to obfuscate the training data by using the previous updated obfuscation parameters and thus to generate obfuscated data for training, (b) (i) a process of inputting the obfuscated data for training into the discriminator, capable of determining whether its inputted data is real or fake, to thereby allow the discriminator to output a current obfuscation score for training, representing whether the obfuscated data for training is real or fake, by using the current updated determination parameters and (ii) (ii-1) a process of inputting first sub-data for training into the learning network having the current updated learning parameters, to thereby allow the learning network to apply the learning operation to the first sub-data for training by using the current updated learning parameters and thus to output first sub characteristic information for training and a process of updating the current updated learning parameters of the learning network to first sub updated learning parameters such that the first sub-error, calculated by referring to (1) the first sub characteristic information for training or the first sub task specific output for training created by using the first sub characteristic information for training and (2) the ground truth of the training data, is minimized and (ii-2) while increasing the integer k from 2 to n, a process of inputting k-th sub-data for training into the learning network having the (k−1)-th sub updated learning parameters, to thereby allow the learning network to apply the learning operation to the k-th sub-data for training by using the (k−1)-th sub updated learning parameters and thus to output the k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training, and (c) a process of updating the previous updated obfuscation parameters of the obfuscation network to current updated obfuscation parameters such that the representative sub-error, calculated by referring to at least part of the first sub-error to the n-th sub-error created in the process of allowing the learning network to be sub-trained n times, is minimized and such that the current obfuscation score for training is maximized.

Further, the discriminator and the learning network may have been trained by the learning device through (i) (i-1) a process of inputting the training data or the modified data for training into the discriminator having the previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters to the current updated determination parameters such that the previous modification score for training is maximized and such that the previous obfuscation score for training is minimized and (ii) a process of inputting the obfuscated data for training into the learning network having the previous updated learning parameters, to thereby allow the learning network to apply the learning operation to the obfuscated data for training by using the previous updated learning parameters and thus to output main characteristic information for training and a process of updating the previous updated learning parameters to the current updated learning parameters such that at least one main error, calculated by referring to (1) the main characteristic information for training or a main task specific output for training created by using the main characteristic information for training and (2) the ground truth of the training data, is minimized.

Meanwhile, the obfuscated data which are concealed, i.e., anonymized, by the trained obfuscation network in accordance with the present disclosure may be provided or sold to a buyer of big data of images.

Also, in accordance with one example embodiment of the present disclosure, when the obfuscated image data, e.g., anonymized image data or concealed image data, are provided or sold to the buyer, the testing method of the trained obfuscation network may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby generate concealed data from the original data owned by the buyer or acquired from other sources, and use the concealed data for his/her own learning network. Also, the buyer may use at least two of the concealed data, the original image data owned by the buyer or acquired from other sources, and the concealed image data provided or sold to the buyer, together for the buyer's learning network.

Meanwhile, if the testing method of the trained obfuscation network is implemented as the program instructions that can be executed by a variety of the computer components, then computational overhead may occur in the computing devices of the buyer when accuracy of the trained obfuscation network is set as high. Therefore, in accordance with one example embodiment of the present disclosure, the buyer is allowed to lower the accuracy to prevent the computational overhead.

The present disclosure has an effect of performing obfuscation, i.e., concealment or anonymization, in a simple and accurate way, since a process of searching general data for personal identification information and a process of concealing the personal identification information are eliminated.

The present disclosure has another effect of protecting privacy and security of the original data by generating the obfuscated data, i.e., concealed or anonymized data through irreversibly obfuscating the original data.

The present disclosure has still another effect of generating the obfuscated data recognized as similar or same by computers but recognized as different by humans.

The present disclosure has still yet another effect of stimulating a big data trade market.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training an obfuscation network capable of obfuscating original data to protect personal information, comprising steps of:
    (a) inputting, by a learning device, training data into an obfuscation network having one or more previous updated obfuscation parameters, to thereby allow the obfuscation network to obfuscate the training data by using the previous updated obfuscation parameters and thus to generate obfuscated data for training;
    (b) performing, by the learning device, (i) a process of inputting the obfuscated data for training into a discriminator, capable of determining whether its inputted data is real or fake, to thereby allow the discriminator to output a current obfuscation score for training, representing whether the obfuscated data for training is real or fake, by using one or more current updated determination parameters and (ii) (ii-1) a process of inputting first sub-data for training into a learning network having one or more current updated learning parameters, to thereby allow the learning network to apply a learning operation to the first sub-data for training by using the current updated learning parameters and thus to output first sub characteristic information for training and a process of updating the current updated learning parameters of the learning network to first sub updated learning parameters such that at least one first sub-error, calculated by referring to (1) the first sub characteristic information for training or a first sub task specific output for training created by using the first sub characteristic information for training and (2) a ground truth of the training data, is minimized and (ii-2) while increasing an integer k from 2 to n, where is n is an integer greater than 2, a process of inputting k-th sub-data for training into the learning network having one or more (k−1)-th sub updated learning parameters, to thereby allow the learning network to apply the learning operation to the k-th sub-data for training by using the (k−1)-th sub updated learning parameters and thus to output k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training; and
    (c) updating, by the learning device, the previous updated obfuscation parameters of the obfuscation network to current updated obfuscation parameters such that at least one representative sub-error, calculated by referring to at least part of the first sub-error to the n-th sub-error created in the process of allowing the learning network to be sub-trained n times, is minimized and such that the current obfuscation score for training is maximized.

2. The method of claim 1, before the step of (b), further comprising a step of:
    (b-1) performing, by the learning device, (i) (i-1) a process of inputting the training data or the modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters of the discriminator to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters of the learning network to the current updated learning parameters such that at least one main error, calculated by referring to (1) the main characteristic information for training or a main task specific output for training created by using the main characteristic information for training and (2) the ground truth of the training data, is minimized.

3. The method of claim 1, wherein at least one of the first sub-data for training to the n-th sub-data for training is the training data.

4. The method of claim 1, wherein the first sub-data for training to the (n−1)-th sub-data for training are the obfuscated data for training and wherein the n-th sub-data for training is the training data.

5. The method of claim 1, wherein the learning device generates the representative sub-error by summation or averaging of the first sub-error to the n-th sub-error.

6. The method of claim 1, wherein the learning device generates the representative sub-error by weighted summation of the first sub-error to the n-th sub-error.

7. The method of claim 6, wherein the learning device allows a weight of one part of sub-errors corresponding to the training data and a weight of a remaining part of sub-errors corresponding to the obfuscated data for training to be different.

8. The method of claim 1, wherein a maximum of the previous modification score for training is 1 as a value for determining the training data or the modified data for training as real by the discriminator and wherein a minimum of the previous obfuscation score for training is 0 as a value for determining the obfuscated data for training as fake by the discriminator.

9. A method for testing an obfuscation network capable of obfuscating original data to protect personal information, comprising steps of:
(a) on condition that a learning device has performed or supported another device to perform (a1) a process of inputting training data into the obfuscation network having the previous updated obfuscation parameters, to thereby allow the obfuscation network to obfuscate the training data by using the previous updated obfuscation parameters and thus to generate obfuscated data for training; (a2) (i) a process of inputting the obfuscated data for training into the discriminator, capable of determining whether its inputted data is real or fake, to thereby allow the discriminator to output a current obfuscation score for training, representing whether the obfuscated data for training is real or fake, by using the current updated determination parameters and (ii) (ii-1) a process of inputting first sub-data for training into the learning network having the current updated learning parameters, to thereby allow the learning network to apply the learning operation to the first sub-data for training by using the current updated learning parameters and thus to output first sub characteristic information for training and a process of updating the current updated learning parameters of the learning network to first sub updated learning parameters such that the first sub-error, calculated by referring to (1) the first sub characteristic information for training or the first sub task specific output for training created by using the first sub characteristic information for training and (2) the ground truth of the training data, is minimized and (ii-2) while increasing the integer k from 2 to n, where n is an integer greater than 2, a process of inputting k-th sub-data for training into the learning network having the (k−1)-th sub updated learning parameters, to thereby allow the learning network to apply the learning operation to the k-th sub-data for training by using the (k−1)-th sub updated learning parameters and thus to output the k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training; and (a3) a process of updating the previous updated obfuscation parameters of the obfuscation network to current updated obfuscation parameters such that the representative sub-error, calculated by referring to at least part of the first sub-error to the n-th sub-error created in the process of allowing the learning network to be sub-trained n times, is minimized and such that the current obfuscation score for training is maximized, performing, by a testing device, a process of acquiring test data; and
(b) inputting, by the testing device, the test data into the obfuscation network, to thereby allow the obfuscation network to obfuscate the test data by using the learned obfuscation parameters of the obfuscation network and thus to output obfuscated data for testing.

10. The method of claim 9, wherein, before the step of (a2),
the discriminator and the learning network have been trained by the learning device through (i) (i-1) a process of inputting the training data or modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters to the current updated learning parameters such that at least one main error, calculated by referring to (1) the main characteristic information for training or a main task specific output for training created by using the main characteristic information for training and (2) the ground truth of the training data, is minimized.

11. A learning device for training an obfuscation network capable of obfuscating original data to protect personal information, comprising:
at least one memory that stores instructions; and at least one processor configured to execute the instructions to perform: (I) a process of inputting training data into an obfuscation network having one or more previous updated obfuscation parameters, to thereby allow the obfuscation network to obfuscate the training data by using the previous updated obfuscation parameters and thus to generate obfuscated data for training, (II) (i) a process of inputting the obfuscated data for training into a discriminator, capable of determining whether its inputted data is real or fake, to thereby allow the discriminator to output a current obfuscation score for training, representing whether the obfuscated data for training is real or fake, by using one or more current updated determination parameters and (ii) (ii-1) a process of inputting first sub-data for training into a learning network having one or more current updated learning parameters, to thereby allow the learning network to apply a learning operation to the first sub-data for training by using the current updated learning parameters and thus to output first sub characteristic information for training and a process of updating the current updated learning parameters of the learning network to first sub updated learning parameters such that at least one first sub-error, calculated by referring to (1) the first sub characteristic information for training or a first sub task specific output for training created by using the first sub characteristic information for training and (2) a ground truth of the training data, is minimized and (ii-2) while increasing an integer k from 2 to n, where n is an integer greater than 2, a process of inputting k-th sub-data for training into the learning network having one or more (k−1)-th sub updated learning parameters, to thereby allow the learning network to apply the learning operation to the k-th sub-data for training by using the (k−1)-th sub updated learning parameters and thus to output k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training, and (III) a process of updating the previous updated obfuscation parameters of the obfuscation network to current updated obfuscation parameters such that at least one representative sub-error, calculated by referring to at least part of the first sub-error to the n-th sub-error created in the process of allowing the learning network to be sub-trained n times, is minimized and such that the current obfuscation score for training is maximized.

12. The learning device of claim 11, wherein, before the process of (II), the processor further performs:
(II-1) (i) (i-1) a process of inputting the training data or modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters of the discriminator to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters of the learning network to the current updated learning parameters such that at least one main error, calculated by referring to (1) the main characteristic information for training or a main task specific output for training created by using the main characteristic information for training and (2) the ground truth of the training data, is minimized.

13. The learning device of claim 11, wherein at least one of the first sub-data for training to the n-th sub-data for training is the training data.

14. The learning device of claim 11, wherein the first sub-data for training to the (n−1)-th sub-data for training are the obfuscated data for training and wherein the n-th sub-data for training is the training data.

15. The learning device of claim 11, wherein the processor generates the representative sub-error by summation or averaging of the first sub-error to the n-th sub-error.

16. The learning device of claim 11, wherein the processor generates the representative sub-error by weighted summation of the first sub-error to the n-th sub-error.

17. The learning device of claim 16, wherein the processor allows a weight of one part of sub-errors corresponding to the training data and a weight of a remaining part of sub-errors corresponding to the obfuscated data for training to be different.

18. The learning device of claim 11, wherein a maximum of the previous modification score for training is 1 as a value for determining the training data or the modified data for training as real by the discriminator and wherein a minimum of the previous obfuscation score for training is 0 as a value for determining the obfuscated data for training as fake by the discriminator.

19. A testing device for testing an obfuscation network capable of obfuscating original data to protect personal information, comprising:
at least one memory that stores instructions; and
at least one processor configured to execute the instructions to perform: (I) on condition that a learning device has performed (I1) a process of inputting training data into the obfuscation network having the previous updated obfuscation parameters, to thereby allow the obfuscation network to obfuscate the training data by using the previous updated obfuscation parameters and thus to generate obfuscated data for training, (I2) (i) a process of inputting the obfuscated data for training into the discriminator, capable of determining whether its inputted data is real or fake, to thereby allow the discriminator to output a current obfuscation score for training, representing whether the obfuscated data for training is real or fake, by using the current updated determination parameters and (ii) (ii-1) a process of inputting first sub-data for training into the learning network having the current updated learning parameters, to thereby allow the learning network to apply the learning operation to the first sub-data for training by using the current updated learning parameters and thus to output first sub characteristic information for training and a process of updating the current updated learning parameters of the learning network to first sub updated learning parameters such that the first sub-error, calculated by referring to (1) the first sub characteristic information for training or the first sub task specific output for training created by using the first sub characteristic information for training and (2) the ground truth of the training data, is minimized and (ii-2) while increasing the integer k from 2 to n, where n is an integer greater than 2, a process of inputting k-th sub-data for training into the learning network having the (k−1)-th sub updated learning parameters, to thereby allow the learning network to apply the learning operation to the k-th sub-data for training by using the (k−1)-th sub updated learning parameters and thus to output the k-th sub characteristic information for training and a process of updating the (k−1)-th sub updated learning parameters of the learning network to k-th sub updated learning parameters such that at least one k-th sub-error, calculated by referring to (1) the k-th sub characteristic information for training or a k-th sub task specific output for training created by using the k-th sub characteristic information for training and (2) the ground truth of the training data, is minimized, to thereby perform a process of allowing the learning network having the current updated learning parameters to be sub-trained n times, wherein the first sub-data for training to the n-th sub-data for training are selected among the training data and the obfuscated data for training, and (I3) a process of updating the previous updated obfuscation parameters of the obfuscation network to current updated obfuscation parameters such that the representative sub-error, calculated by referring to at least part of the first sub-error to the n-th sub-error created in the process of allowing the learning network to be sub-trained n times, is minimized and such that the current obfuscation score for training is maximized, a process of acquiring test data and (II) a process of inputting the test data into the obfuscation network, to thereby allow the obfuscation network to obfuscate the test data by using the learned obfuscation parameters of the obfuscation network and thus to output obfuscated data for testing.

20. The testing device of claim 19, wherein, before the process of (I2), the discriminator and the learning network have been trained by the learning device through (i) (i-1) a process of inputting the training data or modified data for training into the discriminator having one or more previous updated determination parameters, to thereby allow the discriminator to output a previous modification score for training, representing whether the training data or the modified data for training is real or fake, by using the previous updated determination parameters, wherein the modified data for training is created by modifying the training data or the obfuscated data for training, (i-2) a process of inputting the obfuscated data for training into the discriminator having the previous updated determination parameters, to thereby allow the discriminator to output a previous obfuscation score for training, representing whether the obfuscated data for training is real or fake, by using the previous updated determination parameters, and (i-3) a process of updating the previous updated determination parameters to the current updated determination parameters such that the previous modification score for training is maximized and such that the previous obfuscation score for training is minimized and (ii) a process of inputting the obfuscated data for training into the learning network having one or more previous updated learning parameters, to thereby allow the learning network to apply the learning operation to the obfuscated data for training by using the previous updated learning parameters and thus to output main characteristic information for training and a process of updating the previous updated learning parameters to the current updated learning parameters such that at least one main error, calculated by referring to (1) the main characteristic information for training or a main task specific output for training created by using the main characteristic information for training and (2) the ground truth of the training data, is minimized.

\* \* \* \* \*